US011782651B2

(12) United States Patent
Ogasawara (10) Patent No.: US 11,782,651 B2
(45) Date of Patent: Oct. 10, 2023

(54) IMAGE FORMATION APPARATUS AND METHOD OF CONTROL

(71) Applicant: SHARP KABUSHIKI KAISHA, Sakai (JP)

(72) Inventor: Kenji Ogasawara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/677,732

(22) Filed: Feb. 22, 2022

(65) Prior Publication Data

US 2022/0283753 A1 Sep. 8, 2022

(30) Foreign Application Priority Data

Mar. 4, 2021 (JP) .................. 2021-034315

(51) Int. Cl.
*G06F 3/12* (2006.01)
(52) U.S. Cl.
CPC ............ *G06F 3/1204* (2013.01); *G06F 3/126* (2013.01); *G06F 3/1273* (2013.01)
(58) Field of Classification Search
None
See application file for complete search history.

(56) References Cited

U.S. PATENT DOCUMENTS

| 10,965,826 | B2* | 3/2021 | Nishiyama | ......... H04N 1/00413 |
| 2019/0297211 | A1* | 9/2019 | Tanaka | .............. H04N 1/00708 |
| 2019/0384552 | A1 | 12/2019 | Sakaguchi | |
| 2020/0301622 | A1* | 9/2020 | Kadoda | ............. G02B 27/0172 |

FOREIGN PATENT DOCUMENTS

JP 2019-217687 A 12/2019

* cited by examiner

*Primary Examiner* — Frantz Bataille
(74) *Attorney, Agent, or Firm* — ScienBiziP, P.C.

(57) ABSTRACT

An image formation apparatus includes a processor and a memory. The memory stores instructions that cause the processor to: record a job history of a job executed by the image formation apparatus; receive an operation for the image formation apparatus to execute a job based on the job history recorded; detect that a job setting condition set, when the operation is received, has changed with respect to a job setting condition established when the job history is recorded; and switch a job set by the image formation apparatus based on a detection result regarding change in the job setting condition and a type of the operation.

4 Claims, 8 Drawing Sheets

IMAGE FORMATION APPARATUS AND METHOD OF CONTROL

CROSS-REFERENCE TO RELATED APPLICATION

The present application claims priority from Japanese Patent Application Number 2021-34315, the content of which is hereby incorporated by reference into this application.

BACKGROUND OF THE INVENTION

Field of the Invention

The present disclosure relates to an image formation apparatus and other things.

Description of the Related Art

Conventional image formation apparatuses, including multifunction printers, reuse previous printing setting histories to eliminate the inconvenience of setting when a user establishes printing settings, such as printing paper size, the number of printed sheets, and monochrome printing.

Japanese Patent Application Laid-Open No. 2019-217687 discloses the following for instance, with regard to the reuse of printing setting histories. One thing is that in response to an instruction to immediately execute a function corresponding to a selected history button, or in response to a history button selected with a setting different from default settings, displaying a detail check screen and executing a job upon a press on an execution button. The other thing is that whether to execute a job immediately upon a press on a history button needs to be specified in advance.

SUMMARY OF THE INVENTION

However, the foregoing technique requires a user to press the execution button after checking the displayed detail check screen, and the technique requires pre-setting on whether to execute the job immediately upon a press on the history button and requires other things. This hinders reduction in user operation.

To solve the above problem, it is an object of the present disclosure to provide an image formation apparatus and other things that can reduce user operations in job setting.

The present disclosure provides an image formation apparatus. The image formation apparatus includes a processor and a memory. The memory stores instructions that cause the processor to: record a job history of a job executed by the image formation apparatus; receive an operation for the image formation apparatus to execute a job based on the job history recorded; detect that a job setting condition set, when the operation is received, has changed with respect to a job setting condition set when the job history is recorded; and switch a job executed by the image formation apparatus based on a detection result regarding change in the job setting condition and a type of the operation.

The present disclosure provides a method for controlling an image formation apparatus. The method includes recording a job history of a job executed by the image formation apparatus. The method also includes receiving an operation for the image formation apparatus to execute a job based on the job history recorded. The method also includes detecting that a job setting condition set, when the operation is received, has changed with respect to a job setting condition set when the job history is recorded. The method also includes switching a job executed by the image formation apparatus based on a detection result regarding change in the job setting condition and a type of the operation.

The image formation apparatus according to one aspect of the present invention can reduce user operations in job setting.

DETAILED DESCRIPTION OF THE INVENTION

A preferred embodiment of the present disclosure will be described with reference to the accompanying drawings.

1. Preferred Embodiment

Figure 1:
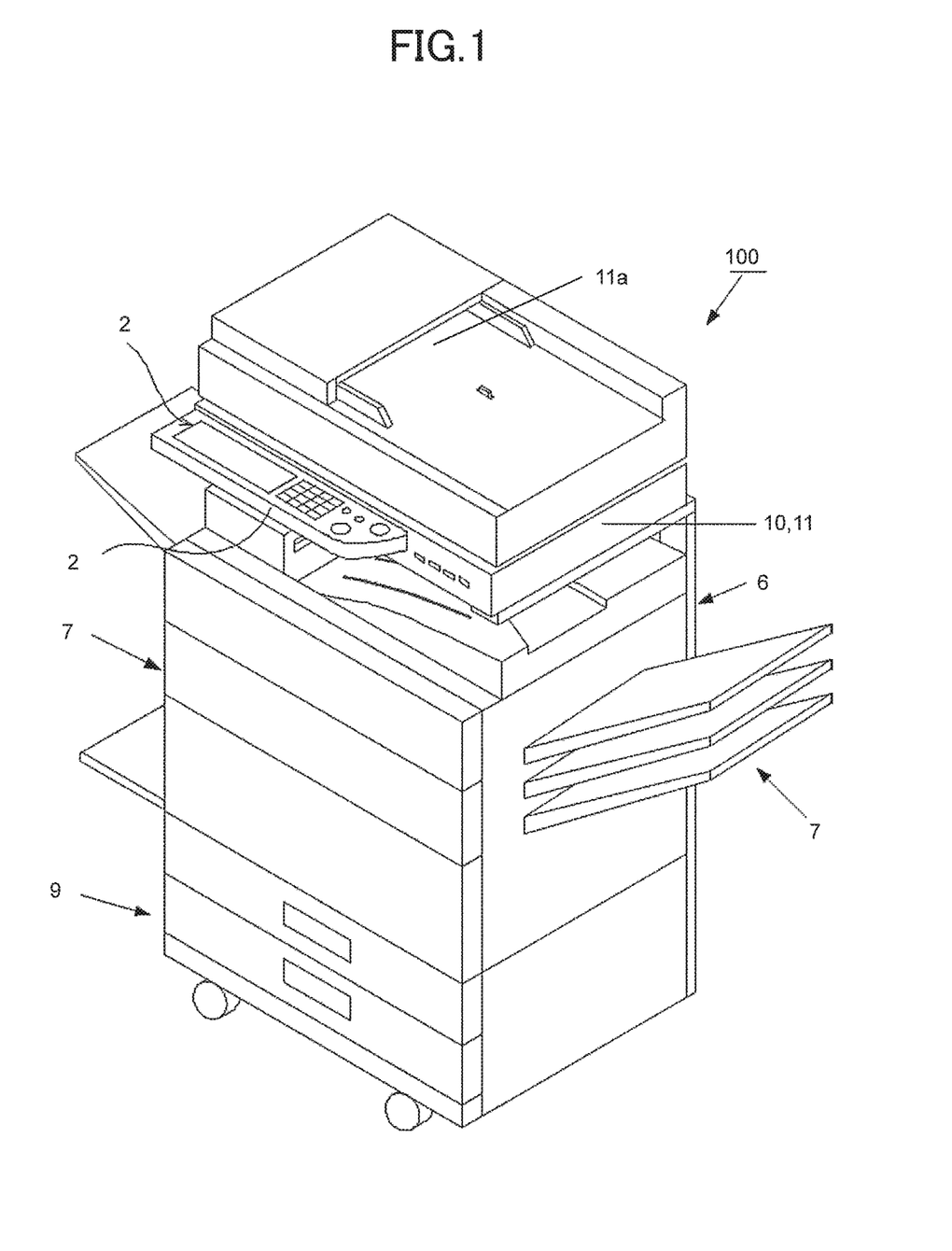
FIG. 1 is an external view of a multifunction printer according to a preferred embodiment.
Figure 2:
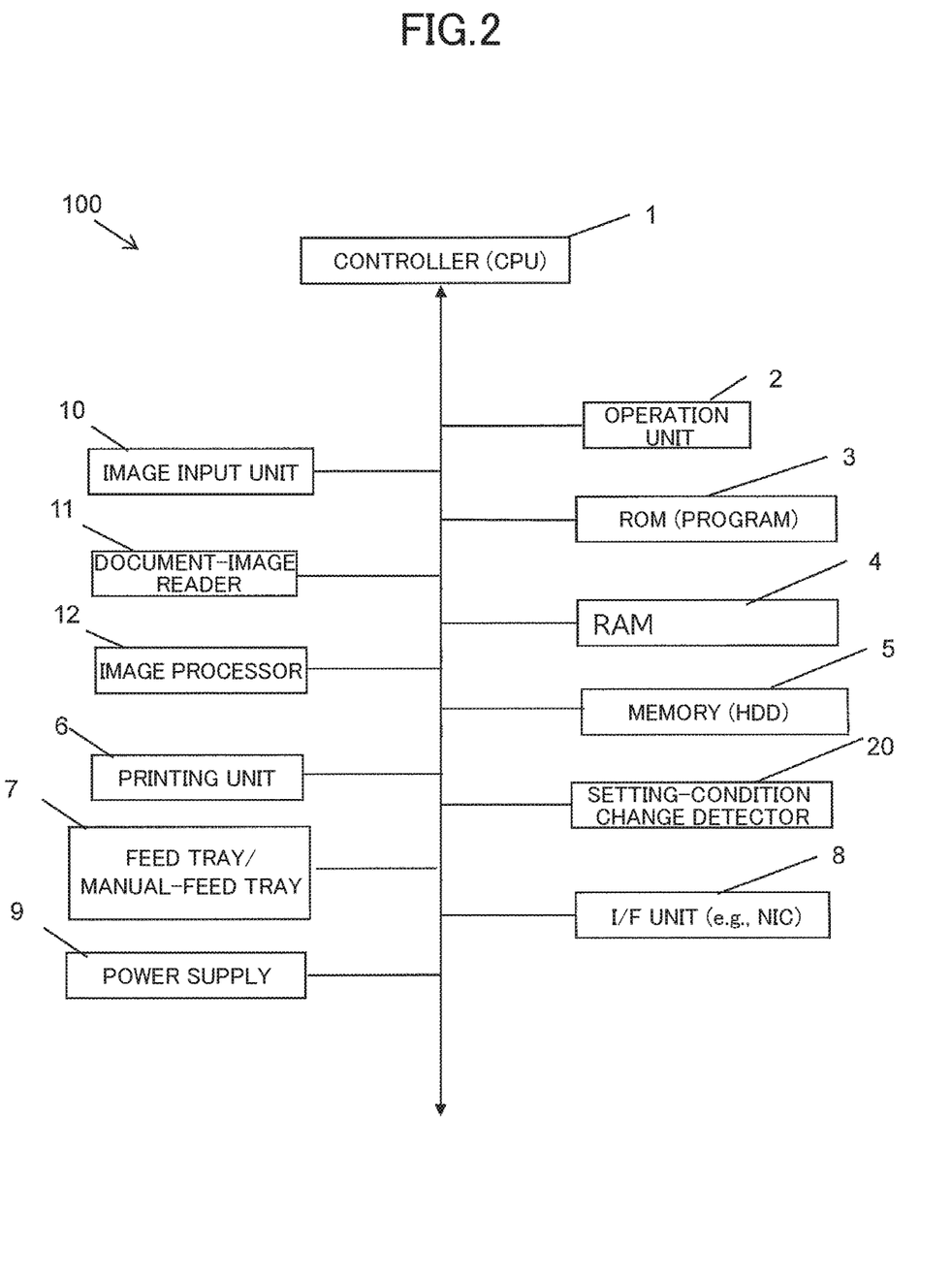
FIG. 2 is a block diagram illustrating a control system in the multifunction printer.

FIG. 1 is an external view of a multifunction printer (corresponding to an image formation apparatus) according to a preferred embodiment. FIG. 2 is a block diagram illustrating a control system.

FIGS. 1 and 2 show a multifunction printer (MFP or multifunction peripheral/printer/product) 100 is a piece of integrated equipment serving as, but not limited to, a copier, printer, image scanner and facsimile.

1.1 Overall Configuration

The following describes the details of the configuration in FIGS. 1 and 2. Sign 1 denotes a controller that achieves control in the preferred embodiment by using, for instance, a central processing unit (CPU). Sing 2 denotes an operation unit with components, such as a touch panel having the function of input with various operation keys and switches and having the function of displaying settings and job histories. Sign 3 denotes a read only memory (ROM) storing a processing program. Sign 4 denotes a random access memory (RAM) that stores settings on the apparatus. Sign 5 denotes a memory (storage device, such as an HDD) that stores copy data, print data, and job histories. Sign 6 denotes a printing unit capable of printing and output onto paper sheets. Sign 7 denotes a feed tray/manual feed tray that stores paper sheets. Sign 8 denotes an interface (I/F) unit for connection with a network and telephone line. Sign 9 denotes a power supply that supplies power. Sign 10 denotes an image input unit that inputs image data to the multifunction printer 100. Sign 11 denotes a document-image reader that reads the image of a document and inputs image data to the image input unit 10. Sign 12 denotes an image processor having the function of image processing, where image data read by the document-image reader 11 undergoes conversion into an established file format (e.g., TIFF, GIF, and JPEG).

The image input unit 10 may input image data from a storage medium, such as a USB memory or an SD card. Alternatively, the image input unit 10 may input image data from another terminal device via the I/F unit 8, which is connected to this other terminal device. The I/F unit 8 can specifically use a network interface card (NIC).

1.2 Functional Configuration

The multifunction printer 100 records the history of an executed job in the memory (recorder) 5 and executes a job based on the recorded job history in response to an operation received by the operation unit 2. The multifunction printer 100 includes a setting-condition change detector 20 that detects that a job setting condition established when the operation unit 2 receives an operation to execute a job based on the job history has changed with respect to a job setting condition established when the job history is recorded. The multifunction printer 100 also includes a controller 1 that switches a job executed by the multifunction printer 100, in accordance with a detection result produced by the setting-condition change detector 20 in relation to a change in the job setting condition and in accordance with an operation type received by the operation unit 2, which is composed of a touch panel.

The foregoing operation type received by the operation unit 2 includes some gesture and some multi-touch, including a press, a press-and-hold, a flick, a double tap, and a two-point touch.

The controller 1 can switch between whether to immediately execute a job under the job setting condition in the job history, whether to execute a job after alert issuance, and whether to execute a job via setting screens provided for individual jobs, in accordance with the detection result produced by the setting-condition change detector 20 in relation to a change in the job setting condition, and in accordance with the operation type received by the operation unit 2.

When a job execution button is included in each job history listed and displayed on the operation unit 2, the multifunction printer 100 in the preferred embodiment can execute a job immediately in response to a user press on the button without going through setting screens provided for the individual jobs.

In some cases, the multifunction printer 100 cannot execute a job in line with the content of the job history due to, for instance, a change in the setting condition of the multifunction printer 100 made with respect to the job setting condition established when the job history is recorded. The multifunction printer 100 even in these cases changes control so as to immediately execute a job upon receiving an operation performed on the execution button through, for instance, a press-and-hold or a flick, or so as to execute a job after alert display, in order to save user's time and effort as much as possible.

By, for instance, recording the job setting condition in the RAM 4 at the time of recording the job history in the memory 5, the multifunction printer 100 grasps a change in the job setting condition by referring to a detection result produced by the setting-condition change detector 20 when the operation unit 2 undergoes an operation for job execution based on the job history.

The following details the function of the multifunction printer 100 and a process performed by the multifunction printer 100.

Performance of Multifunction Printer

The multifunction printer 100 in the preferred embodiment can perform SPF (automatic document feeding) and document size detection on a document placed on a document tray 11*a* of the document-image reader 11. SPF is a capability of the document-image reader 11 with its reader section fixed.

The printing unit 6 has a color-printing capability and a duplexing capability.

The multifunction printer 100 can also staple paper sheets undergone printing.

The multifunction printer 100 also has an automatic-paper-selection (APS) capability, in which the multifunction printer 100 selects a paper sheet automatically from a plurality of trays containing respective paper sheets of different sizes (e.g., A4- A3- and B5-sized sheets), to perform printing on the selected paper sheet.

The multifunction printer 100 as a matter of course has an SPF (single-side scanning) capability, a monochrome-printing capability, and a manual-paper-feed capability as standard.

Size Setting of Paper Sheet Contained in Feed Tray

Three feed trays, the first to third feed trays, contain the following paper sheets of A4, A3 and B5 sizes, all of which are in conformance with Japanese Industrial Standards (JIS).

In the first feed tray, A4-sized paper sheets

In the second feed tray, A3-sized paper sheets

In the third feed tray, B5-sized paper sheets

Example Operation of Execution Button

There are three kinds of example operation of the execution button in the operation unit 2, as follows.

1. For Normal Button Press (Excluding a Press-and-Hold and a Flick)

Execute a job immediately in response to no change in a job setting condition detected from a job history Move to the setting screen of each job listed in the history in response to a change detected in the job setting condition 2. For Button Press-and-Hold Execute the job immediately in response to no change in the job setting condition detected from the job history Display an alert dialog asking whether to immediately execute the job when the job is executable, even in response to a change detected in the job setting condition; in addition, whether to move to the setting screen may be selected.

3. For Button Flick

Execute the job immediately in response to no change in the job setting condition detected from the job history Execute a job forcedly even in response to a change detected in the job setting condition In this case, no alert dialog is displayed.

Other Example Operations of Execution Button

Other than the foregoing example button operations 1 to 3, some gesture and some multi-touch as listed below can be included in the button operation type.

A double button tap

A two-point button touch (multi-touch)

Supplement to Control of Apparatus

Job execution in response to a change made with reference to a job history involves some rounding process.

In a setting where the prohibition of duplexing is established after the history of duplexing is recorded for instance, job execution from the job history leads to one-side printing.

When job execution is impossible, an error message (MSG) dialog telling that a job is inexecutable through any operation is displayed, and the job is stopped.

A job is inexecutable where, for instance, a setting has reached the upper limit of the number of printing sheets, or an administrator makes a user authorization setting prohibitive after job history recording.

1.3 Process Steps

Figure 3:
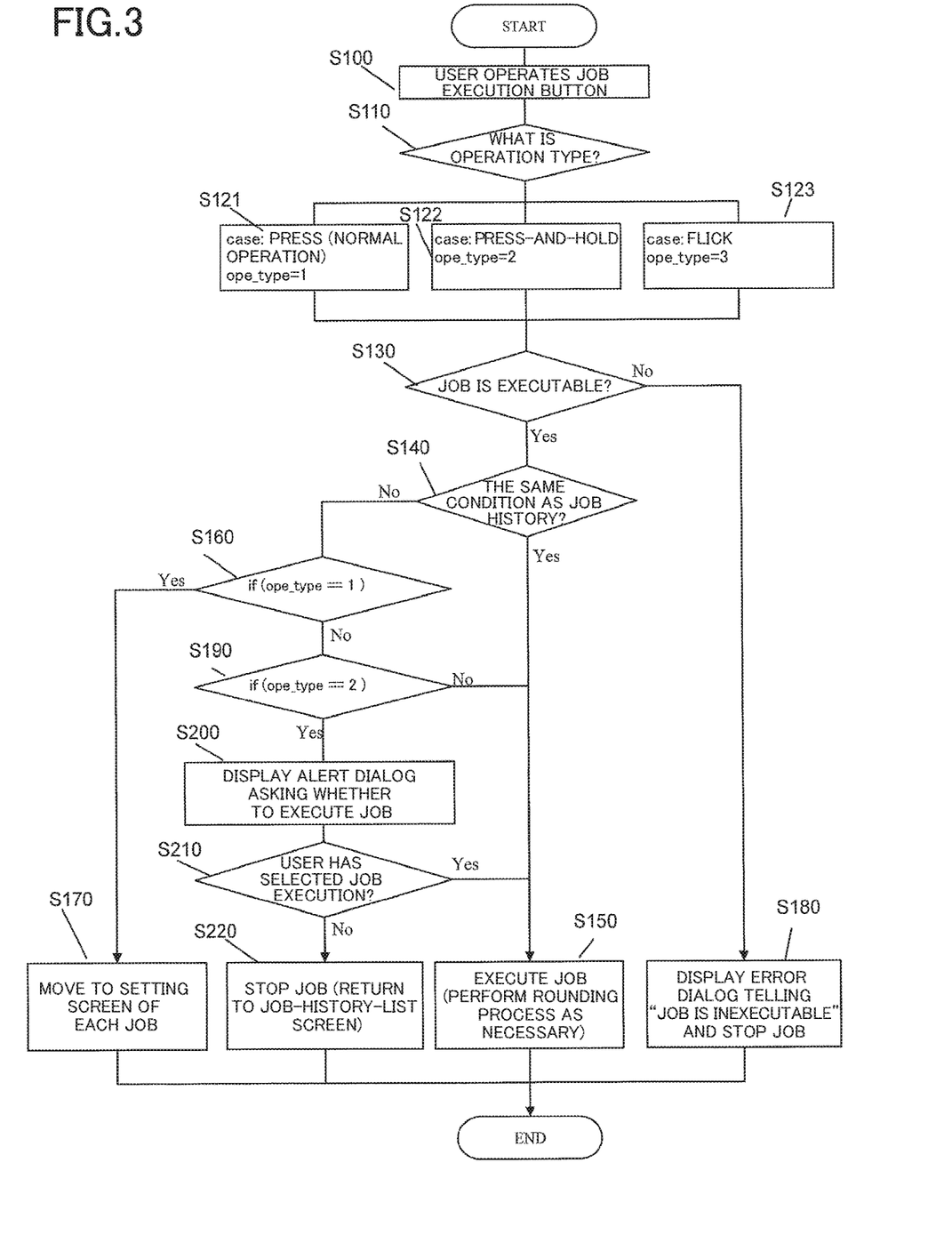
FIG. 3 is a flowchart showing the control of the multifunction printer.

FIG. 3 is a flowchart showing individual process steps that are executed by the multifunction printer 100 according to the preferred embodiment in accordance with the foregoing operation type, listed in the item "Example Operation of Execution Button", that is received by the operation unit 2.

FIG. 3 illustrates, step by step, how the controller 1 performs control in accordance with whether the setting-condition change detector 20 has detected a change in a job setting condition on the basis of a job history stored by the memory 5, and in accordance with the type of operation received by the operation unit 2. Step 100 to Step 220 in the following description will be abbreviated to S100 to S220.

As illustrated in FIG. 3, in response to a user's button operation for job execution on the operation unit 2 (S100), the controller 1 determines in S110 the type of the operation. The determined operation type, "case", includes a press (normal operation) in S121, denoted as ope_type=1, a press-and-hold in S122, denoted as ope_type=2, and a flick in S123, denoted as ope_type=3.

The next process step is S130, where the controller 1 determines whether the job is executable.

If determining in S130 that the job is executable, that is, the job is not inexecutable (if YES in S130), the process proceeds to S140, where the controller 1 determines whether the condition of the current job is the same as that in the history of a previous job (job history in the past).

If determining in S130 that the job is inexecutable (if NO in S130), the process proceeds to S180, where the controller 1 controls the operation unit 2 to display an error message (MSG) dialog telling that the job is inexecutable, and the controller 1 then stops the job.

If determining in S140 that the condition of the current job is the same as that in the job history (if YES in S140), the controller 1 executes the job immediately in S150. The controller 1 in this case performs rounding as necessary.

If the condition of the current job is different from that in the job history (if NO in S140), the process proceeds to S160, where the controller 1 determines whether the operation type performed on the execution button is a press, which is denoted as ope_type=1. If determining that the operation type is a press, ope_type=1, (if YES in S160), the process proceeds to S170, where the display moves to the setting screen of each job on the basis of the history.

If determining in S160 that the operation type is not a press, ope_type=1, (if NO in S160), the process proceeds to S190, where the controller 1 determines whether the operation type performed on the execution button is a press-and-hold, which is denoted as ope_type=2. If determining that the operation type is a press-and-hold, ope_type=2, (if YES in S190), the process proceeds to S200, where the controller 1 controls the operation unit 2 to display an alert dialog asking whether to execute the job, for instance, whether to execute the job immediately. The process then proceeds to S210, where the controller 1 determines whether the user has selected job execution.

If determining in S190 that the operation type is not a press-and-hold, ope_type=2 (if NO in S190), the process proceeds to S150, where the controller 1 executes the job. This determination result corresponds to the operation type, "case" that is a flick, which is denoted as ope_type=3; thus in response to a flick, the controller 1 forcedly executes the job even when the job condition has changed. Here, the operation unit 2 displays no alert dialog. In addition, a rounding process can be introduced in S150 as necessary.

If determining in S210 that the user has selected job execution (if YES in S210), the process proceeds to S150, where the controller 1 executes the job.

If determining that the user has not selected job execution (if NO in S210), the controller 1 stops the job in S220. The display in this case moves back to a job-history-list screen.

The following describes examples 1 to 3 of job processing. Each example relates to copy job execution. In the following description, process-step numbers (S100 to S220) are recited in correspondence with the flowchart in FIG. 3. FIGS. 4 to 8 illustrate example displays on the setting screen 30 of the operation unit 2, which is composed of touch switches for use in each example.

In FIGS. 4 to 8, the setting screen 30 displays, in its copy setting region 30*a*, various setting items, including document size (e.g., A4 size), color mode (monochrome or color mode), whether the trays are in auto-paper-selection (APS) mode, the presence or absence of stapling, copy scale, copy density, and the presence or absence of duplex-copy selection.

The setting screen 30 also displays, in its sheet setting region 30*b*, the paper size, i.e., the A4 size, A3 size and B5 size, of paper sheets placed in the trays, and the presence or absence of manual feed. The setting screen 30 also displays, in its copy-count setting region 30*c*, the number of copies. A region with a display, "START" (execution button region) 30*d* serves as an execution button. Although the foregoing has described, by way of example, paper sizes (e.g., A4 size) conforming to JIS, any paper size may be used.

1.4 Example Operation

Example 1

Example 1 is an instance where a copy job is executed, followed by another job at a later date by reusing the history of the previous copy job.

Copy Job Execution

Figure 4:
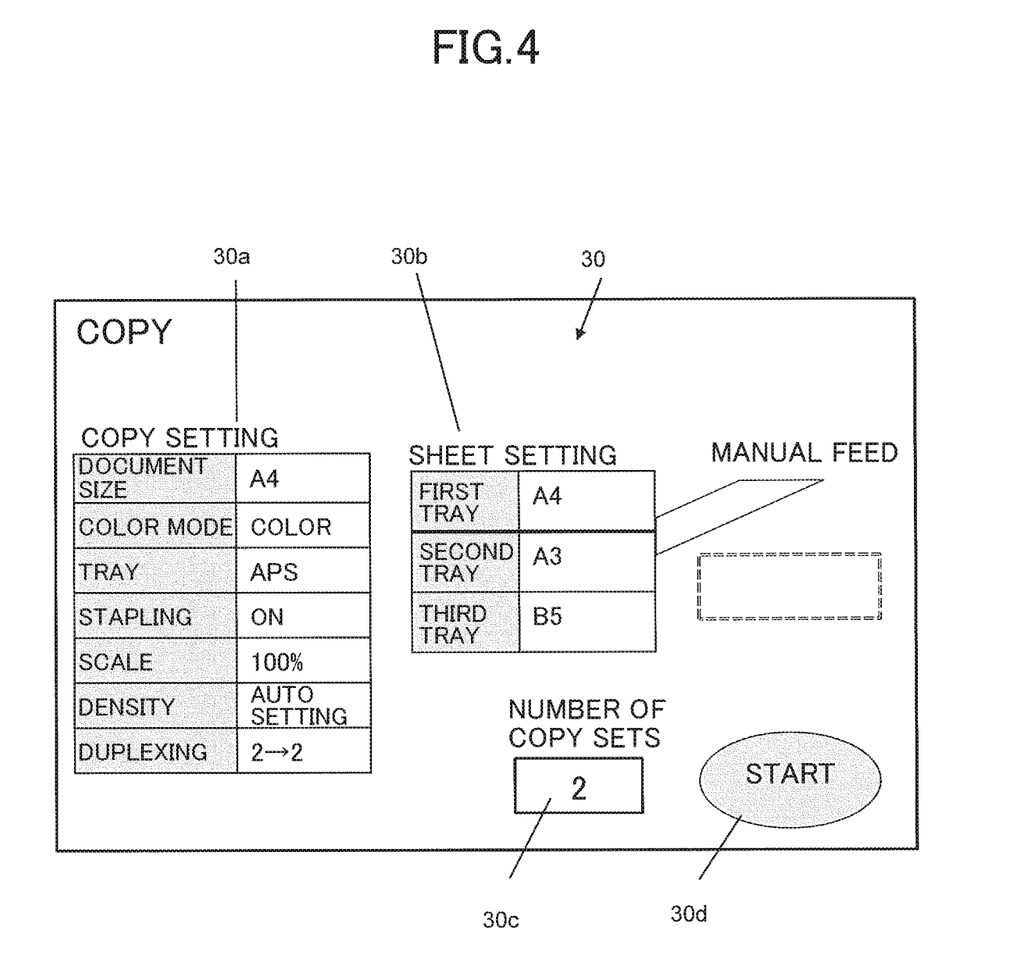
FIG. 4 is an example setting screen in the multifunction printer.

The user executed the following copy job via a copy mode screen of the setting screen 30 illustrated in FIG. 4. The settings for the copy job were what are shown in the copy setting region 30*a* of the setting screen 30 in FIG. 4 as follows: SPF duplexing (three A4-sized documents); for an item "tray", an auto-paper-selection (APS) mode; for an item "stapling", ON; for an item "the number of copy sets", two; and color printing.

The user executed the copy job, where three A4-sized paper sheets underwent duplexing, followed by stapling together as a set, and two sets of the stapled sheets were output.

The multifunction printer 100 recorded the job as a history.

Execution Based on Job History

At a later data, the user placed two A3-sized documents on the SPF and operated a button for executing the foregoing job history. The user operated the execution button through three kinds of operations 1 to 3: a normal press, a press-and-hold, and a flick.

Herein, the number of documents placed on the SPF were unknown at the time of the job execution.

1. For Normal Press on Execution Button (Corresponding to S121)

Although the document size in the history was the A4 size, the setting-condition change detector 20 detected that the documents placed on the SPF were A3-sized documents.

The setting-condition change detector 20 thus determined that the setting condition had changed (this corresponds to NO in S140).

The job was inexecutable under the job settings recorded in the history. Accordingly, a copy mode screen (copy setting screen) as illustrated FIG. 5 was displayed (this corresponds to S170).

Figure 5:
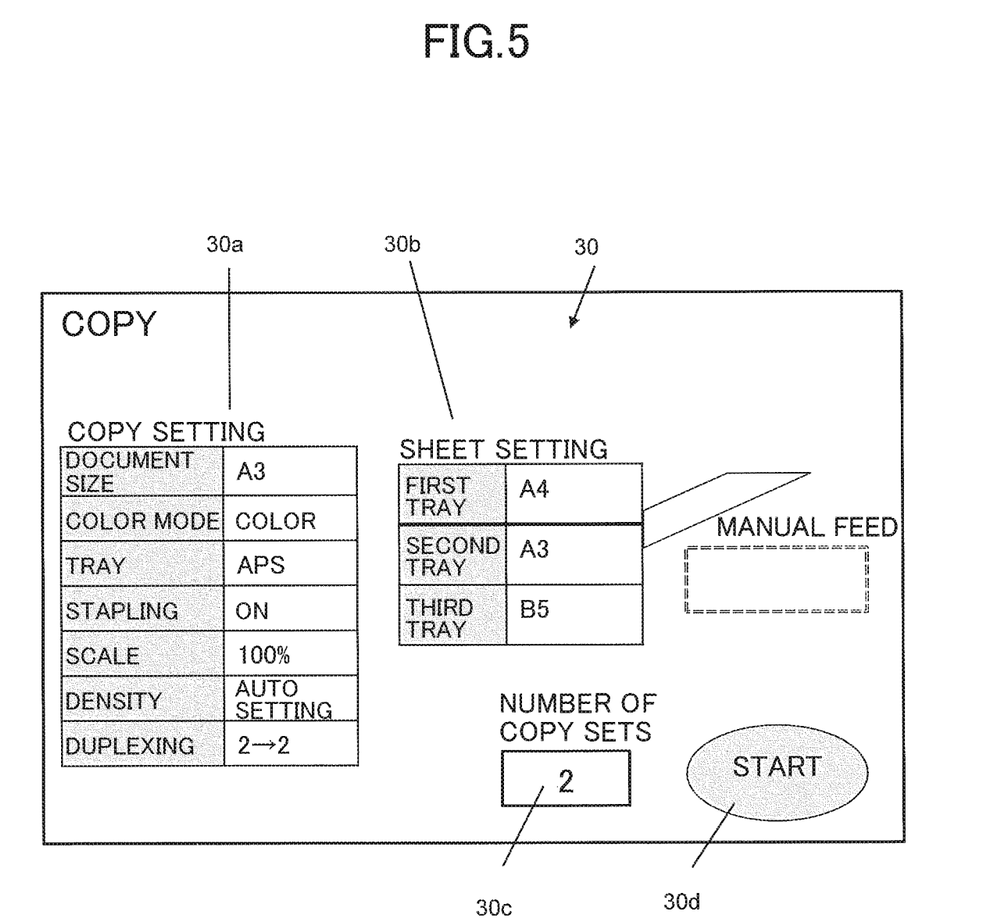
FIG. 5 is an example setting screen in the multifunction printer.

The user checked the settings on the setting screen and pressed the execution button (start button) 30d.

As displayed in the copy setting region 30a, the auto-paper-selection (APS) mode was set for the item tray, and thus the second feed tray (containing A3-sized paper sheets) was automatically selected for printing.

The user executed this copy job, where two A3-sized paper sheets underwent duplexing, followed by stapling together as a set, and two sets of the stapled sheets were output.

2. For Press-and-Hold of Execution Button (Corresponding to S122)

The setting condition had changed (this corresponds to NO in S140), and an alert dialog was displayed (this corresponds to S200).

The alert dialog showed the following message on the screen of the operation unit 2 for instance:

"The job cannot be executed in line with the history. Wish to continue?
History: A4-sized document
[OK] [Cancel]".

[OK] is a button for positive. [Cancel] is a button for negative.

It is noted that a button, "setting screen", which is used for moving to the copy setting screen, may be added.

For a press on the [OK] button, the second feed tray (containing A3-sized paper sheets) is used for printing, because the auto-paper-selection (APS) mode has been set for the item tray.

3. For Flick of Execution Button (Corresponding to S123)

Although the setting condition had changed (this corresponds to NO in S140), the job continued to be executed (this corresponds to S150).

The document-image reader 11 read the two A3-size documents without doing anything.

In this case as well, the second feed tray (containing A3-sized paper sheets) was used for printing, because the auto-paper-selection (APS) mode had been set for the item tray.

Example 2

Example 2 is an instance where a copy job is executed on the basis of the job history in Example 1 with the staples exhausted.

The user placed five A4-sized documents on the SPF and operated the button for executing the job history described in Example 1. The user operated the execution button through three kinds of operations 1 to 3: a normal press, a press-and-hold, and a flick.

1. For Normal Press on Execution Button (Corresponding to S121)

The staples were exhausted, and the setting-condition change detector 20 thus determined that the setting condition had changed (this corresponds to NO in S140).

The job was inexecutable under the job settings recorded in the history. Accordingly, a copy mode screen was displayed (this corresponds to YES in S160 and to S170).

The setting screen 30 in copy mode in this case displayed that the staples were exhausted, A display "No Staples" was shown in the copy setting region 30a illustrated in FIG. 5.

2. For Press-and-Hold of Execution Button (Corresponding to S122)

The setting condition had changed, and an alert dialog was displayed (this corresponds to S200).

The alert dialog showed a message saying,
"The job cannot be executed in line with the history. Wish to continue?
History: Stapling ON, but no staples left
[OK] [Cancel]".

3. For Flick of Execution Button (Corresponding to S123)

Although the setting condition had changed, the job continued to be executed (this corresponds to S150).

The copy job offered two sets of five duplex-printed A4-sized paper sheets. Each set did not undergo stapling together in this case.

Example 3

Example 3 is an instance where although a printed image is to be missing partly, a job is executable.

Copy Job Execution

The user executed the following copy job via a copy mode screen.

Figure 6:
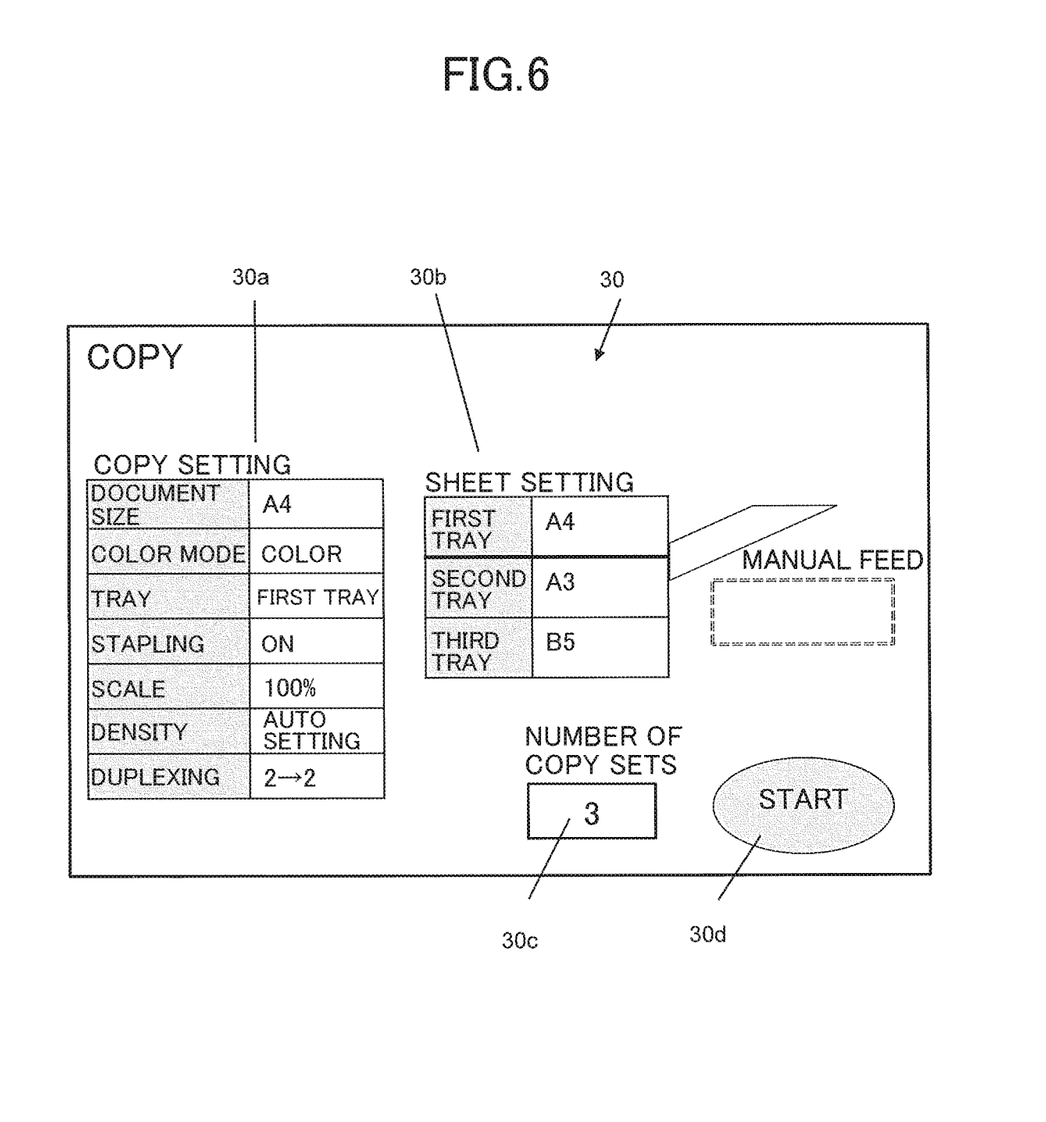
FIG. 6 is an example setting screen in the multifunction printer.

The user input various settings on the copy mode screen as illustrated in FIG. 6. The detailed settings were as follows: SPF duplexing (two A4-sized documents); for an item "tray", the first feed tray; for an item "the number of copy sets", three; and color printing.

The copy job offered three sets of two duplex-printed A4-sized paper sheets.

The multifunction printer 100 recorded the job as a history.

Setting Change

The administrator afterwards changed the settings on the first and third feed tray and replaced the paper sheets within the trays.

Paper Size Setting
In the first feed tray, B5-sized paper sheets
In the second feed tray, A3-sized paper sheets
In the third feed tray, A4-sized paper sheets Execution Based on Job History The user afterwards placed three A4-sized documents on the SPF and operated the button for executing the job history.

1. For Normal Press on Execution Button (Corresponding to S121)

Based on the fact that the setting on the first feed tray had changed to B5-sized paper sheets, the setting-condition change detector 20 determined that the setting condition had changed (this corresponds to NO in S140).

The job was inexecutable under the job settings recorded in the history. Accordingly, a copy mode screen was displayed (this corresponds to S170).

The copy mode screen of the setting screen 30 showed, in the sheet setting region 30b, that the first feed tray was supplied with B5-sized paper sheets and that the third feed tray was supplied with A4-sized paper sheets.

Figure 7:
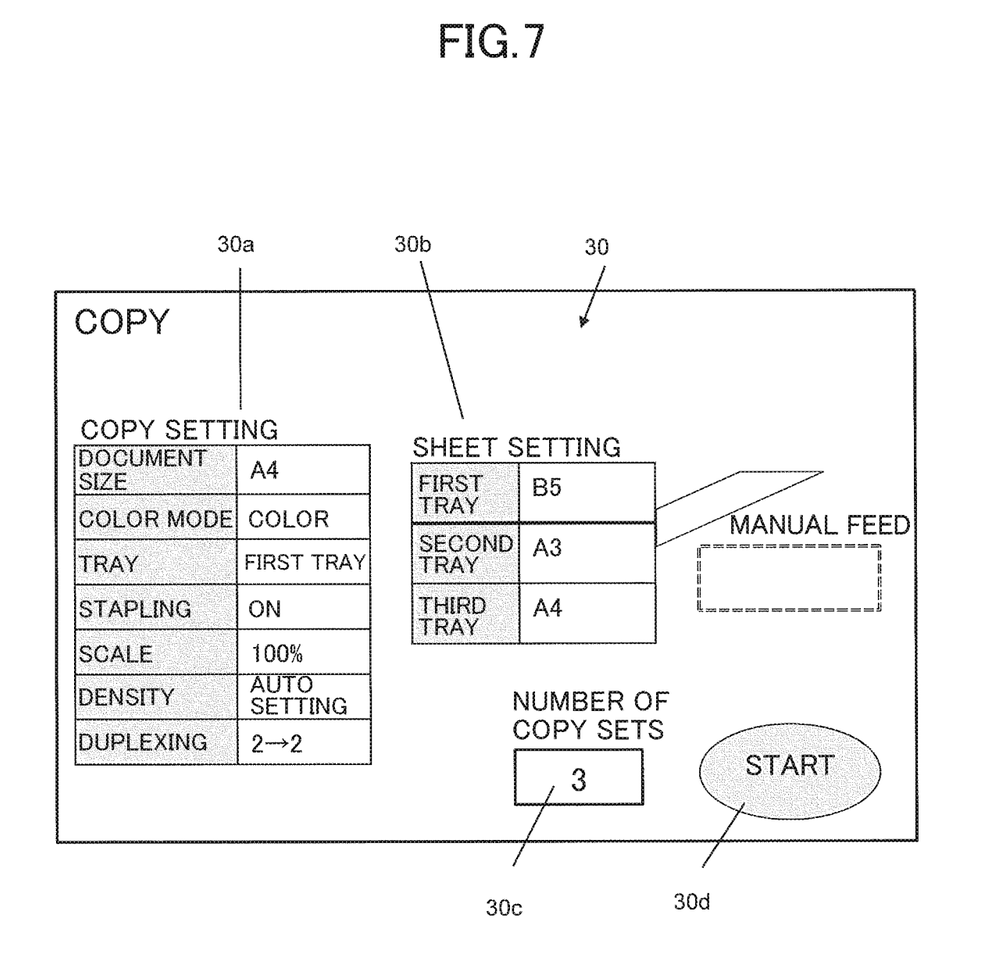
FIG. 7 is an example setting screen in the multifunction printer.
Figure 8:
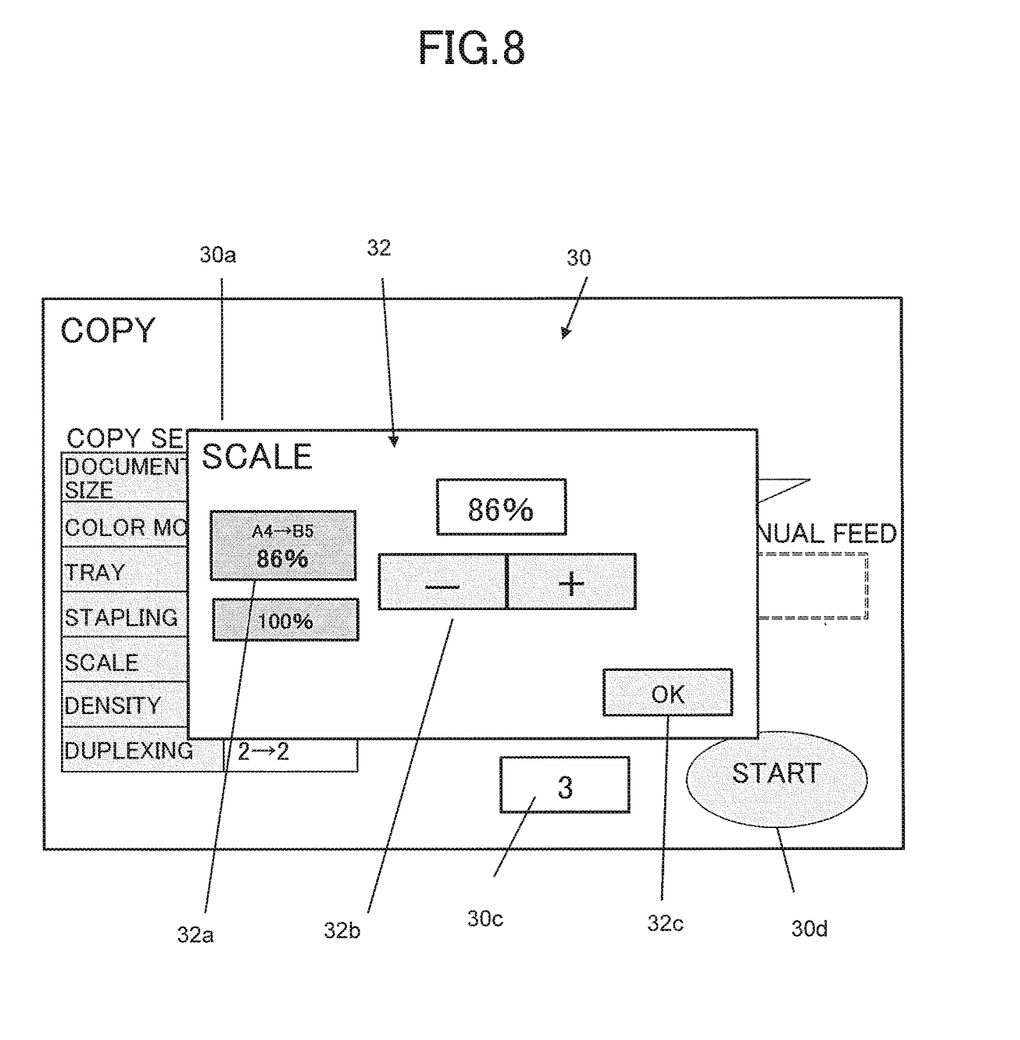
FIG. 8 is an example setting screen in the multifunction printer.

In this case, the user can press a button "scale" in the copy setting region 30a on the copy mode screen to display a scale setting screen 32, followed by pressing a button "A4→B5 86%" (denoted by Sign 32a). Alternatively, the user can press a button "−" and "+" (denoted by Sign 32*b*) to change the value of scale, followed by pressing a button "OK" (denoted by Sign 32*c*) to set the copy scale at 86%.

Alternatively, the user can change the tray for use to the third feed tray.

2. For Press-and-Hold of Execution Button (Corresponding to S122)

The setting condition had changed, and an alert dialog was displayed (this corresponds to S200).

Such an alert dialog was displayed on the screen of the operation unit 2 for instance.

The alert dialog showed a message saying,

"The job cannot be executed in line with the history. Wish to continue?

History: B5-sized paper sheets in the First Feed Tray [OK] [Cancel]".

The user in this case pressed the [OK] button, and printing thus continued though a printed image was to be missing partly (because of a scale of 100%).

3. For Flick of Execution Button (Corresponding to S123)

Although the setting condition had changed (this corresponds to NO in S140), the job continued to be executed (this corresponds to S150).

The copy job offered printed paper sheets with images partly missing (because of the 100% scale). To be specific, the copy job offered three sets of three duplex-printed B5-sized paper sheets.

1.5 Effects

The preferred embodiment offers selection from among some operations (e.g., a press-and-hold, a flick, and a multi-touch) other than a normal press on a button for immediate execution via a job history. The preferred embodiment also enables switching between "forced job execution", "alert display as necessary", and "move to a job setting screen" in accordance with the state of a multifunction printer, thus saving user's time and effort (operation steps), including a setting check and an operation for change, as much as possible.

Such a multifunction printer can thus execute jobs immediately from a list of job histories (e.g., a copy job, a scan job, and a facsimile job) without going through setting screens provided for the individual jobs. This multifunction printer achieves control without losing user's convenience when the state of the multifunction printer has changed since history recording, thus failing to execute a job in line with the settings in the history (i.e., a resultant printed sheet may be unsatisfactory for a user).

2. Technical Scope of Preferred Embodiment

The foregoing specific configuration is not limited to the preferred embodiment. Designs and other things within a range not departing from the gist of the present invention are also included in the scope of the claims.

That is, although the preferred embodiment has described a multifunction printer serving as a copier, scanner and facsimile, one aspect of the present invention includes an image formation apparatus that does not serve as one or more of a scanner, facsimile and other functions.

In the preferred embodiment, a program that is operated by the individual units is a program for controlling a CPU and the other components in such manner that the foregoing functions in the preferred embodiment are implemented (i.e., a program for a computer to function). Information used in these units is accumulated temporarily in a transitory storage device (e.g., a RAM) when processed and is then stored in various storage devices, such as a ROM and an HDD. The information is then read for correction and writing by the CPU, as necessary.

Here, the program may be stored in any non-transitory storage medium, such as a semiconductor medium, (e.g., a ROM and a non-volatile memory card). Other examples of such a non-transitory storage medium include an optical storage medium and a magneto-optical storage medium, such as a digital versatile disc (DVD), a magneto-optical disc (MO), a mini disc (MD), a compact disc (CD), and a Blue-ray (registered trademark; BD) disc. Another example of such a non-transitory storage medium is a magnetic storage medium (e.g., a magnetic tape and a flexible disc).

Executing a program having been loaded can implement the foregoing functions described in the preferred embodiment. In addition, processing in cooperation with, for instance, an operating system or other application programs on the basis of commands of the program can implement the functions described in the present disclosure.

For market distribution, the program can be stored in a transportable storage device or can be transferred to a server computer connected via a network, such as the Internet. A storage device within the server computer is also included in one aspect of the present invention as a matter of course.

The foregoing units in the preferred embodiment in part or in whole may be implemented as a large-scale integration (LSI) circuit, which is typically an integrated circuit. The functional block of each unit may be formed individually into a chip, or the functional blocks in part or in whole may be integrated to form a chip. Moreover, such an integrated circuit may be formed through not only LSI, but also using a dedicated circuit or a general-purpose processor. Moreover, when the semiconductor technology advances to thus introduce, instead of LSI, a technique of forming an integrated circuit, an integrated circuit formed through this technique can be used as a matter of course.

What is claimed is:

1. An image formation apparatus comprising:
   a processor; and
   a memory,
   wherein the memory stores instructions that cause the processor to:
   record a job history of a job executed by the image formation apparatus;
   receive an operation input to an execution button for the image formation apparatus to execute a new job based on the job history recorded;
   detect that a job setting condition, when the operation input is received, has changed with respect to the job setting condition when the job history is recorded; and
   switch whether to immediately execute the new job, which is executed by the image formation apparatus, based on a detection result regarding a change in the job setting condition and whether the operation input to the execution button is a first type of operation or a second type of operation.

2. The image formation apparatus according to claim 1, wherein
   the first type of operation and the second type of operation comprise a gesture or multi-touch including a press, a press-and-hold, a flick, a double tap, and a two-point touch.

3. The image formation apparatus according to claim 1, wherein
   based on the detection result regarding the change in the job setting condition and based on whether a type of the operation to the execution button is the first type of operation or a second type of operation, the processor is further caused to switch between to: immediately the new job under the job setting condition in the job history, execute the job after issuing an alert, or execute the job via setting screens provided for individual jobs.

4. A method for controlling an image formation apparatus, the method comprising:
  recording a job history of a job executed by the image formation apparatus;
  receiving an operation input to an execution button for the image formation apparatus to execute a new job based on the job history recorded;
  detecting that a job setting condition, when the operation input is received, has changed with respect to the job setting condition when the job history is recorded; and
  switching whether to immediately execute the new job, which is executed by the image formation apparatus, based on a detection result regarding a change in the job setting condition and whether the operation input to the execution button is a first type of operation or a second type of input operation.

\* \* \* \* \*